US012461492B2

(12) United States Patent
Lintymer et al.

(10) Patent No.: US 12,461,492 B2
(45) Date of Patent: Nov. 4, 2025

(54) METHOD FOR DECORATING A SUBSTRATE

(71) Applicant: Comadur SA, Le Locle (CH)

(72) Inventors: Jan Lintymer, Mamirolle (FR); Alexis Boulmay, Valdahon (FR)

(73) Assignee: Comadur SA, Le Locle (CH)

( * ) Notice: Subject to any disclaimer, the term of this patent is extended or adjusted under 35 U.S.C. 154(b) by 466 days.

(21) Appl. No.: 17/938,140

(22) Filed: Oct. 5, 2022

(65) Prior Publication Data

US 2023/0126038 A1 Apr. 27, 2023

(30) Foreign Application Priority Data

Oct. 25, 2021 (EP) .................................... 21204426
Nov. 11, 2021 (EP) .................................... 21207803

(51) Int. Cl.
*B44C 3/00* (2006.01)
*G04B 19/12* (2006.01)

(52) U.S. Cl.
CPC .............. *G04B 19/12* (2013.01); *B44C 3/005* (2013.01)

(58) Field of Classification Search
None
See application file for complete search history.

(56) References Cited

U.S. PATENT DOCUMENTS 5,234,793 A 8/1993 Sebald et al.
10,086,642 B2 10/2018 Dubach et al.
11,550,261 B2 1/2023 Hiraya
2012/0223050 A1 9/2012 Keller
2013/0089714 A1* 4/2013 Maeda ................. B41M 7/0081 428/195.1
2016/0176228 A1 6/2016 Dubach et al.
2019/0302697 A1 10/2019 Larriere et al.
2022/0065422 A1* 3/2022 Caruso ................... H01Q 1/421

FOREIGN PATENT DOCUMENTS

CH 711 851 A1 6/2017
CH 713 871 A1 1/2019
CH 714 338 B1 5/2019
CH 715 927 A2 9/2020
CH 716 196 A1 11/2020
CH 714 234 B1 5/2021
CH 713 407 B1 1/2022
CH 716 774 B1 4/2023
CH 719 259 B1 4/2024
(Continued)

OTHER PUBLICATIONS

Machine translation of WO-2018114205 (Year: 2025).*
(Continued)

*Primary Examiner* — Allan W. Olsen
(74) *Attorney, Agent, or Firm* — Oblon, McClelland, Maier & Neustadt, L.L.P.

(57) ABSTRACT

A method for decorating a substrate which includes the succession of the following steps: provide the substrate; deposit a layer of a sacrificial material over a surface of the substrate; structure the sacrificial material layer so as to create in this sacrificial material layer a plurality of cavities to form a decorative or technical pattern; eliminate the sacrificial material layer except at the location where the pattern is provided.

19 Claims, 4 Drawing Sheets

(56) References Cited

FOREIGN PATENT DOCUMENTS

| | | | | |
|---|---|---|---|---|
| DE | 10 2008 046 124 | A1 | | 3/2010 |
| EP | 1 548 524 | A1 | | 6/2005 |
| EP | 1 895 370 | A2 | | 3/2008 |
| EP | 1 895 370 | A3 | | 3/2008 |
| EP | 2 871 534 | A1 | | 5/2015 |
| EP | 3 035 129 | A1 | | 6/2016 |
| EP | 3 336 614 | A1 | | 6/2018 |
| EP | 3 339 980 | A1 | | 6/2018 |
| EP | 3 379 342 | A1 | | 9/2018 |
| EP | 3 489 761 | A1 | | 5/2019 |
| EP | 2 798 413 | B1 | | 10/2020 |
| EP | 3 766 651 | A1 | | 1/2021 |
| EP | 3 772 673 | A1 | | 2/2021 |
| EP | 3 907 564 | A1 | | 11/2021 |
| JP | 2020-147849 | A | | 9/2020 |
| JP | 2023-72671 | A | | 5/2023 |
| RU | 2 422 572 | C2 | | 6/2011 |
| RU | 2 717 134 | C1 | | 3/2020 |
| WO | WO 2013/014515 | A1 | | 1/2013 |
| WO | WO 2013/014515 | A9 | | 1/2013 |
| WO | WO-2018114205 | A1 | * | 6/2018 |
| WO | WO 2021/028815 | A1 | | 2/2021 |

OTHER PUBLICATIONS

Combined Russian Office Action and Search Report issued on Mar. 27, 2023 in Russian Patent Application No. 2022127511 (with English translation of office action only), 14 pages.

Office Action issued Dec. 5, 2023, in corresponding Japanese Patent Application No. 2022-165234 (with English Translation), 9 pages.

European Search Report Issued May 18, 2022 in European Application 21207803.4 Filed on Nov. 11, 2021 (with English Translation of Categories of Cited Documents), 3 pages.

Korean Notice of Grounds for Rejection issued May 2, 2024 in Korean Patent Application No. 10/2022-0130728 (with English Translation), 11 pages.

Chinese Office Action issued on Mar. 15, 2024 in Chinese Patent Application No. 202211293143.7 (with English translation), citing references previously submitted, 14 pages.

Office Action issued Sep. 18, 2024, in corresponding Chinese Patent Application No. 202211293143.7 (with English Translation), 12 pages.

* cited by examiner

METHOD FOR DECORATING A SUBSTRATE

CROSS-REFERENCE TO RELATED APPLICATION

This application claims priority to European Patent Application Nos. 21204426.7, filed on Oct. 25, 2021 and 21207803.4, filed on Nov. 11, 2021, the entire disclosures of which are hereby incorporated herein by reference.

TECHNICAL FIELD OF THE INVENTION

The present invention relates to a method for decorating a substrate. In particular, the present invention relates to a method allowing making a matt or satin decoration over a polished substrate, in particular a dial of a watch, and more generally over any external part element of a timepiece such as a bezel, a middle, a back, a link of a bracelet or else a crystal. The present invention also applies to any type of jewellery items, in particular bracelets.

Technological Background

One technique currently used to impart to some areas of a substrate, such as a watch dial, a visual aspect different from that of the rest of the surface of the substrate consists in exposing these areas for example to the action of a laser beam, and then metallising these areas. The metallisation operation is hard to implement, in particular because the areas etched by means of the laser beam that are to be metallised often have small dimensions and therefore it is hard to accurately deposit the metallisation layers over these areas. Indeed, the metallisation layers sometimes exceed the dimensions of the areas of the substrate treated by means of the laser beam over which these metallisations have been deposited, and encroach on the neighbouring areas. Conversely, it is also sometimes possible that the metallisation layers do not completely cover the areas of the substrate that should be metallised, so that these areas remain visible beneath the metallisation layers. In both cases, the final appearance of the substrate treated in this manner is not satisfactory, and a non-negligible part of these substrates should be discarded. Another drawback of this technique is that the substrate is altered by the laser etching operation.

SUMMARY OF THE INVENTION

The present invention aims to overcome the above-mentioned problems as well as other ones by providing a method allowing in particular decorating a substrate accurately.

To this end, the present invention relates to a method for decorating a substrate which comprises the succession of the following steps:

- provide the substrate;
- deposit at least one layer of a sacrificial material over a surface of the substrate;
- structure the sacrificial material layer so as to create in this sacrificial material layer a plurality of cavities to form a decorative or technical pattern;
- eliminate the sacrificial material layer except at the location where the pattern is provided.

According to a special embodiment of the invention, the cavities have different depths.

According to another special embodiment of the invention, at least some of the cavities created in the sacrificial material layer cross this sacrificial material layer up to the substrate.

According to still another special embodiment of the invention, the sacrificial material layer is deposited at the surface of the substrate by physical vapour deposition, by chemical vapour deposition or else by electroplating when the substrate is electrically-conductive.

According to still another special embodiment of the invention, the sacrificial material layer is made by means of one or more metallic material(s) or else of oxides, nitrides, carbides or carboxinitrides of this or these metallic material(s).

According to still another special embodiment of the invention, the metallic material is selected from the group formed by chromium, zirconium, titanium and aluminium.

According to still another special embodiment of the invention, the sacrificial material layer has a thickness comprised between 100 nm and 10 μm.

According to still another special embodiment of the invention, the sacrificial material layer has a thickness comprised between 500 nm and 2 μm.

According to still another special embodiment of the invention, the cavities in the sacrificial material layer are created by wet or dry chemical etching, by laser ablation or else by photolithography.

According to still another special embodiment of the invention, the wet or dry chemical etching affects the entire surface of the sacrificial material layer or else is done through the openings of a mask set over the sacrificial material layer and whose outlines correspond to the decorative or technical pattern that should appear in the sacrificial material layer.

According to still another special embodiment of the invention, the photolithography consists in creating the cavities in the sacrificial material layer directly by ablation by means of a laser beam or by means of a light radiation through the openings of a mask set over this sacrificial material layer and whose outlines correspond to the decorative or technical pattern that should appear in the sacrificial material layer.

According to still another special embodiment of the invention, after structuring of the sacrificial material layer to create the cavities therein, and before elimination of the sacrificial material layer over the entire surface of the substrate except at the location where the pattern is provided, at least one additional finishing layer is deposited over the sacrificial material layer.

According to still another special embodiment of the invention, the additional finishing layer is made by means of one or more metallic material(s) or else of oxides, nitrides, carbides or carboxinitrides of these metallic materials.

According to still another special embodiment of the invention, the metallic material in which the additional finishing layer is made is selected from the group formed by chromium, zirconium, gold, titanium and aluminium.

According to still another special embodiment of the invention, after structuring of the sacrificial material layer and possibly deposition of the additional finishing layer, the following steps are performed:

- deposit a layer of a photosensitive resin over the sacrificial material layer possibly coated with the additional finishing layer;
- expose the photosensitive resin layer directly to the action of a laser beam or else to a light radiation selectively at the locations corresponding to the decorative or technical pattern that should appear in the sacrificial material layer;
- eliminate the photosensitive resin layer and the underlying sacrificial material layer possibly covered by the additional finishing layer at the locations where the photosensitive resin layer has not been insolated;

eliminate the photosensitive resin layer that subsists at the locations where the sacrificial material layer should be preserved.

According to still another special embodiment of the invention, the substrate is an external part element for a watch case or for a jewellery item.

According to still another special embodiment of the invention, the substrate is a bridge, a plate, a bezel, a middle, a crystal, a dial, a back or a bracelet link.

According to still another special embodiment of the invention, the substrate has a polished aspect.

Thanks to these features, the present invention provides a method allowing in particular decorating a substrate without modifying or altering the surface condition of this substrate. In particular, it should be understood that given the fact that the method according to the invention consists in structuring a decorative or technical pattern not directly in the substrate but in a material layer deposited over this substrate, one does not depend on the nature; sometimes extremely hard, of the material in which the substrate is made, and a wide range of materials is available to make the layer in which the pattern will be formed at the surface of the substrate. Moreover, through the set of multiple reflections of ambient light inside the cavities that form the pattern, this pattern has a matt to satin aspect which remarkably stand out of the rest of the surface of the substrate, quite particularly when the substrate has a polished surface condition. It should also be noted that, irrespective of the considered implementation mode, the method according to the invention allows overcoming the problems of positioning accuracy that are frequently encountered when it is desired to decorate substrates such as watch dials or watch crystals.

BRIEF DESCRIPTION OF THE FIGURES

Other features and advantages of the present invention will appear more clearly from the following detailed description of an embodiment of the decoration method according to the invention, this example being provided for merely illustrative and non-limiting purposes only with reference to the appended drawing wherein.

DETAILED DESCRIPTION OF THE INVENTION

The present invention is based on the general inventive idea that consists in making a decorative or technical pattern at the surface of a substrate without modifying or altering the surface condition of this substrate. To this end, the present invention suggests depositing at the surface of the substrate a so-called sacrificial material layer in which a plurality of substantially deep cavities will be made according to a layout that corresponds to the shape of the desired decorative or technical pattern. Possibly coated with one or more additional finishing layer(s) to finish the surface condition and adjust the colour of the underlying sacrificial material layer, these groups of cavities will form, through the play of multiple reflections of incident ambient light that penetrates into these cavities, the desired pattern that will be perceptible to the naked eye. Furthermore, depending on the number and depth of these cavities, the resulting pattern will have a matt or satin aspect which will noticeably stand out from the surrounding surface of the substrate over which this pattern has been structured, in particular when the substrate has a polished surface condition.

Figure 1:
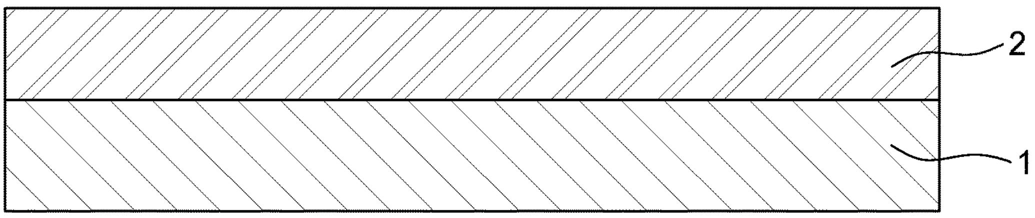
FIG. 1 is a sectional view of a substrate over a surface of which a sacrificial material layer is deposited.

Referred to as a whole by the general reference numeral 1, a substrate is viewed in section in FIG. 1. Preferably yet not necessarily, this substrate 1 has a polished surface condition. This substrate 1 may consist of any type of part for watchmaking such as, without limitation, a bridge, a plate, a bezel, a middle, a crystal, a dial, a back or else a link of a bracelet. It may also consist of a jewellery item such as a bracelet, a ring or a locket. More generally, a substrate in the context of the present patent application should be understood as any support part enabling the implementation of the method according to the invention.

In accordance with the invention and as shown in FIG. 1, the substrate is covered by a sacrificial material layer 2. This sacrificial material layer 2 is made by means of a metallic material preferably selected from the group formed by chromium, chromium nitride, chromium oxinitride, zirconium, zirconium nitride and zirconium oxinitride. This sacrificial material layer 2 has a thickness typically comprised between 100 nm and 10 μm and, preferably, comprised between 500 nm and 2 μm. Of course, the thickness of the sacrificial material layer 2 could exceed these values. The sacrificial material layer 2 may also result from the combination of at least two different metallic materials or else of oxides, nitrides, carbides or carboxinitrides of these metallic materials.

The sacrificial material layer 2 is deposited at the surface of the substrate 1 by any suitable technique such as physical vapour deposition, chemical vapour deposition or else electroplating when the substrate 1 is electrically-conductive.

After deposition of the sacrificial material layer 2 at the surface of the substrate 1, this sacrificial material layer 2 is structured so as to create a plurality of cavities 4 therein.

Figure 2:
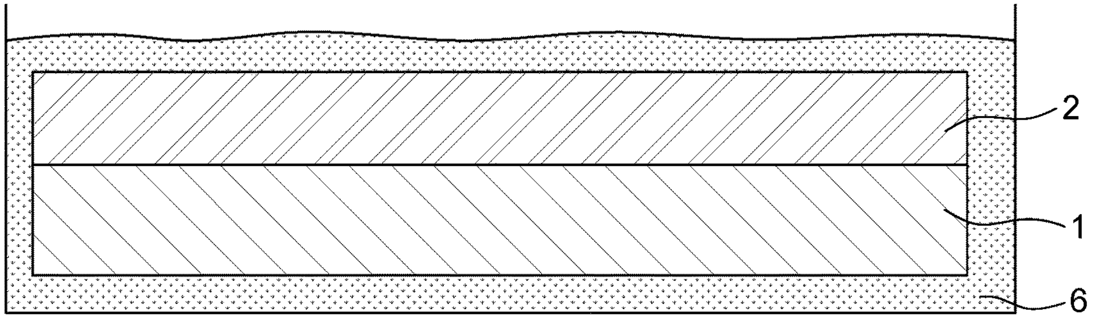
FIG. 2 illustrates making of cavities in the sacrificial material layer by immersing the substrate in a chemical etching bath.

Structuring of the cavities 4 in the sacrificial material layer 2 may be done by any suitable technique. By way of example illustrated in FIG. 2, the substrate 1 coated with the sacrificial material layer 2 is immersed in a chemical etching bath 6, some areas of the sacrificial material layer 2 can, where appropriate, be masked in order not to be subjected to the action of the bath 6. In this manner, the surface of the sacrificial material layer 2 will be subjected to the corrosive action of the bath 6. Since this chemical etching is not perfectly uniform and its effects depend in particular on the time during which the substrate 1 is kept in the bath 6, the cavities 4 formed in the sacrificial material layer 2 will not all have the same depth.

Figure 3:
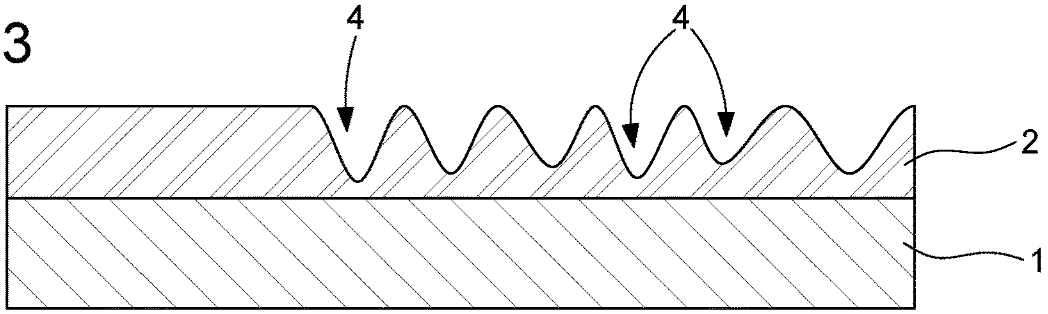
FIG. 3 is a view similar to that of FIG. 1 which illustrates the step of structuring the sacrificial material layer so as to create in this sacrificial material layer a plurality of cavities to form a decorative or technical pattern.

As shown in FIG. 3, once the substrate 1 is removed from the chemical etching bath 6, cavities 4 with different depths some of them can even cross the sacrificial material layer 2 therethroughout up to the substrate 1 are formed over the entire surface of the sacrificial material layer 2 that has been exposed to chemical etching.

According to another embodiment of the invention which is not represented, instead of wet etching of the sacrificial material layer 2, it is possible to proceed with a dry etching of this sacrificial material layer 2, by placing the substrate 1 in a corrosive gaseous atmosphere to create the cavities 4.

According to still another embodiment of the invention which is not represented, instead of a chemical etching of the sacrificial material layer 2, it is also possible to structure this sacrificial material layer 2 by ablation by means of a laser beam.

Figure 4:
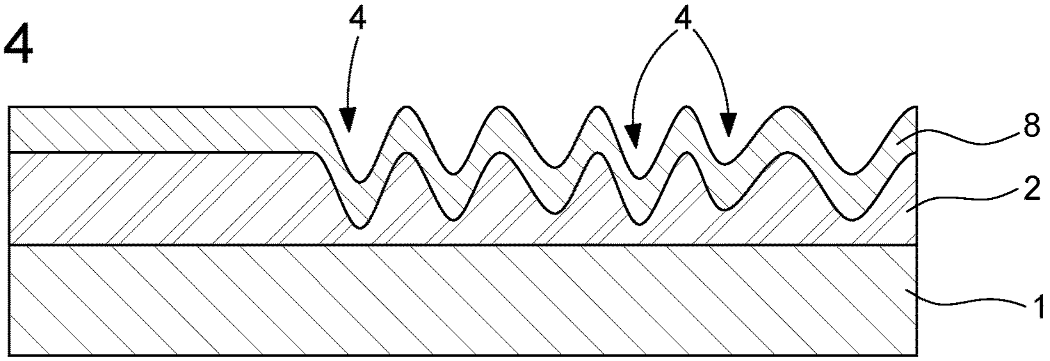
FIG. 4 is a view similar to that of FIG. 3 which illustrates the step of depositing an additional finishing layer over the sacrificial material layer after structuring of this sacrificial material layer.

After structuring of the cavities 4 in the sacrificial material layer 2, the latter can, preferably yet not necessarily, be coated with at least one additional finishing layer 8 as shown in FIG. 4. This additional finishing layer 8 can be deposited, for example, by physical or chemical vapour deposition. This additional finishing layer 8 can be made of the same material as the sacrificial material layer 2. This additional finishing layer 8 is made by means of any metallic material, metallic material oxinitride or alloy of metallic materials; it can in particular be made of gold, chromium, zirconium, titanium or aluminium. This at least one additional finishing layer 8 is intended to finish the surface condition and to adjust the colour of the underlying sacrificial material layer 2.

Figure 5:
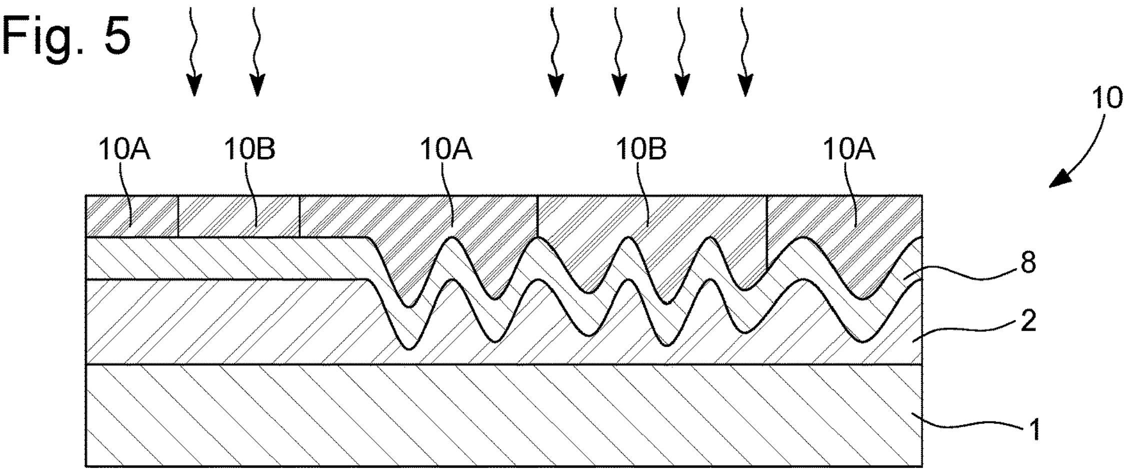
FIG. 5 is a view similar to that of FIG. 4 which illustrates the step of depositing a photosensitive resin layer over the additional finishing layer.

As illustrated in FIG. 5, after deposition of the additional finishing layer 8, a photosensitive resin layer 10 is deposited over this additional finishing layer 8. Afterwards, this photosensitive resin layer 10 is selectively insolated by means of a light radiation at the locations that correspond to the decorative or technical pattern 12 that should appear in the sacrificial material layer 2. In the photosensitive resin layer 10, one can thus distinguish first areas 10A which have not been exposed to the light radiation and second areas 10B which have been exposed to the light radiation and which correspond to the desired pattern 12. The photosensitive resin layer 10 can be selectively insolated for example directly by means of a laser beam whose movements are controlled by a computer, or else by means of a light radiation, for example ultraviolet, through a mask whose openings correspond to the areas of the sacrificial material layer 2 that must be preserved to create the decorative or technical pattern 12 that should appear at the surface of the substrate 1.

Figure 6:
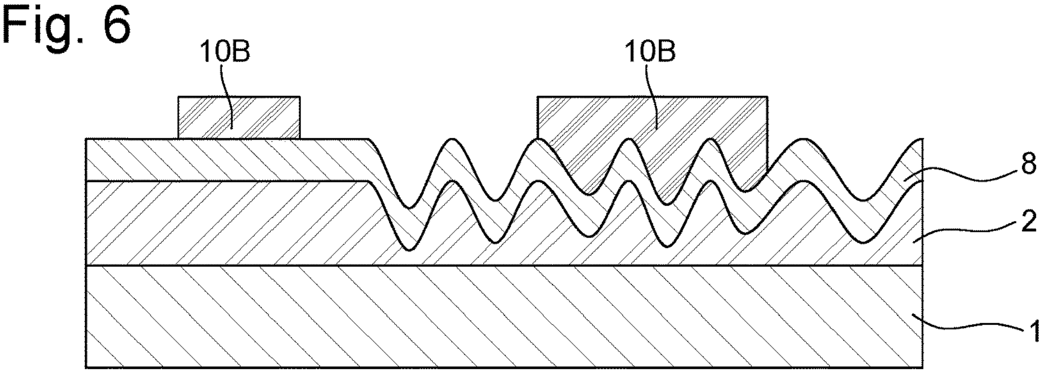
FIG. 6 is a view similar to that of FIG. 5 which illustrates the elimination of the photosensitive resin layer in the areas where this photosensitive resin layer has not been insolated.

After selective insolation of the photosensitive resin layer 10, this photosensitive resin layer 10 is developed so that the first areas 10A that are not exposed to the ultraviolet radiation are eliminated and that only the second areas 10B that have been exposed to light and which correspond to the desired pattern 12 subsist (cf. FIG. 6).

Figure 7:
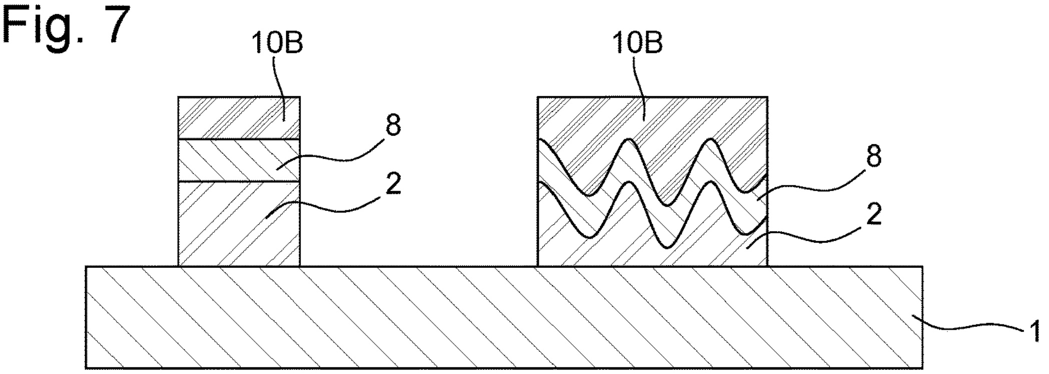
FIG. 7 is a view similar to that of FIG. 6 which illustrates the step of eliminating the sacrificial material layer and the finishing layer in the areas where the photosensitive resin layer has not been insolated.

Then, as illustrated in FIG. 7, the portions of the sacrificial material layer 2 and of the additional finishing layer 8 that are not covered by the photosensitive resin layer 10 are eliminated until exposing the substrate 1 again.

Figure 8:
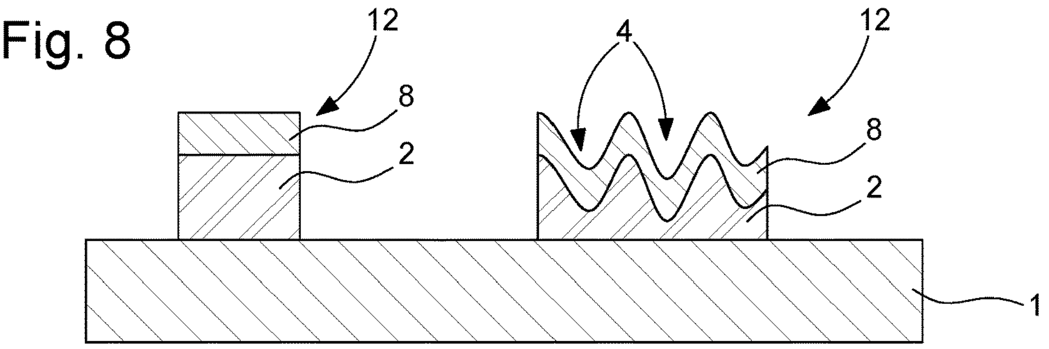
FIG. 8 is a view similar to that of FIG. 7 which illustrates the elimination of the residual photosensitive resin layer which has been insolated at the locations where the sacrificial material layer has been structured and where it should remain to form the decorative pattern.

Finally (FIG. 8), the second areas 10B of the photosensitive resin layer 10 that have been exposed to the ultraviolet radiation are, in turn, eliminated.

The cavities 4 formed in the areas of the sacrificial material layer 2 that subsist at the surface of the substrate 1 do not all have the same depth so that, through the play of multiple reflections of the incident light that penetrates into these cavities 4, the decorative or technical pattern 12 formed by the network of cavities 4 will have a matt or satin aspect which will distinctly stand out the rest of the surface of the substrate 1, in particular when the latter has a polished surface condition. Indeed, the decorative or technical patterns 12 formed by the combination of the cavities 4 have, depending on the depth of these cavities 4, a matt or satin aspect which creates a remarkable visual contrast with the radiance of the rest of the surface of the substrate 1 which is not covered by the sacrificial material layer 2.

It should also be noted that, preferably, the cavities 4 are structured in the sacrificial material layer 2 after exposure of the surface of the sacrificial material layer 2 for example to the corrosive action of the bath 6 so as to form a network with larger dimensions than the dimensions of the desired final pattern 12. Next, for the proper positioning of the pattern 12 with respect to the substrate 1, a determined margin is provided for the proper alignment of this substrate 1 with respect to the mask throughout which the photosensitive resin layer is insolated, which is very advantageous.

Figure 9:
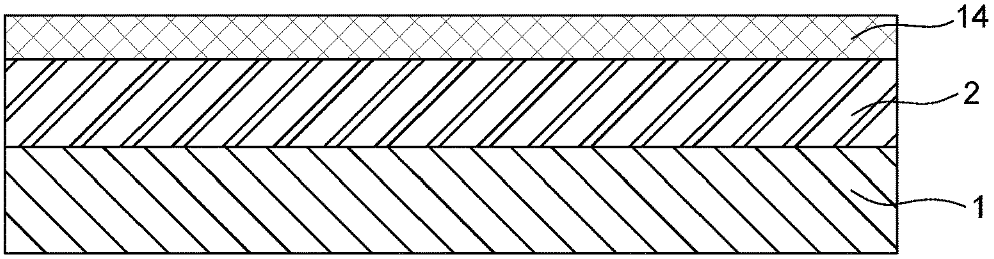
FIG. 9 schematically illustrates a substrate coated with a sacrificial material layer over which a first photosensitive resin layer is deposited.

Another embodiment of the invention is illustrated in FIGS. 9 to 15. In FIG. 9, the substrate 1 is coated with a sacrificial material layer 2 over which a first photosensitive resin layer 14 is deposited.

Figure 10:
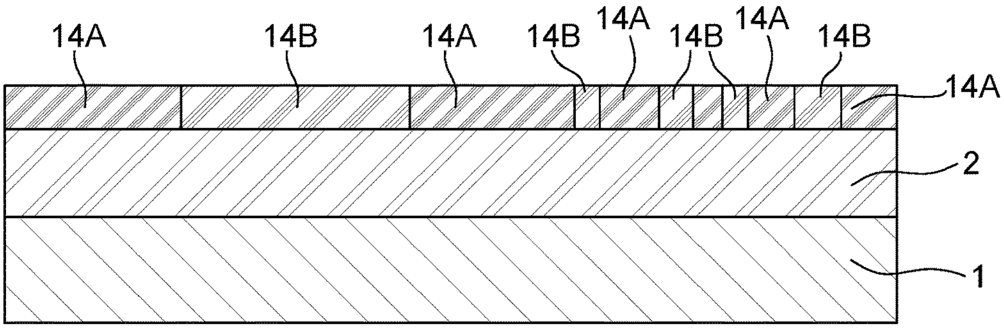
FIG. 10 illustrates the photosensitive resin layer which is selectively insolated to create cavities.

Afterwards, as shown in FIG. 10, this photosensitive resin layer 14 is selectively insolated to create the cavities 4. This selective insolation of the photosensitive resin layer 14 may be performed for example directly by means of a laser beam or through a mask whose openings correspond to the areas of the sacrificial material layer 2 that should be preserved. In the photosensitive resin layer 14, one could thus distinguish first areas 14A which have not been exposed to the selective lighting, and second areas 14B which have been selectively lit and which correspond to the portions of the sacrificial material layer 2 that should be preserved.

Figure 11:
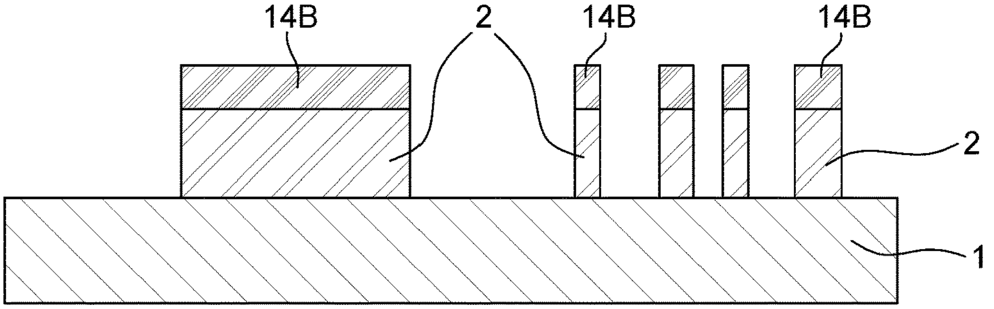
FIG. 11 illustrates the development of the photosensitive resin layer so that first areas that are not insolated are eliminated and that only second areas that have not exposed to light subsist.

After selective insolation, the photosensitive resin layer 14 is developed so that the first areas 14A are eliminated and that only the second areas 14B which have been exposed to light subsist as shown in FIG. 11. Then, the portions of the sacrificial material layer 2 that are not covered by the photosensitive resin layer 14 are eliminated by chemical etching until exposing the substrate 1 again. Finally, the second areas 14B of the photosensitive resin layer 14 which have been exposed to the selective lighting are, in turn, eliminated, so that only the portions of the sacrificial material layer 2 in which the cavities 4 have been structured subsist.

Figure 12:
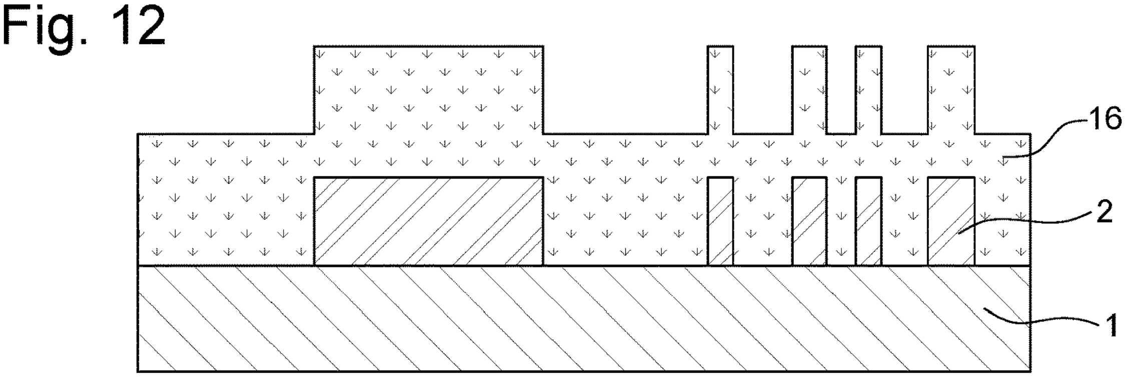
FIG. 12 illustrates the case where, after having created, in the sacrificial material layer, cavities intended to form the pattern, the sacrificial material layer is covered by at least one additional finishing layer.
Figure 13:
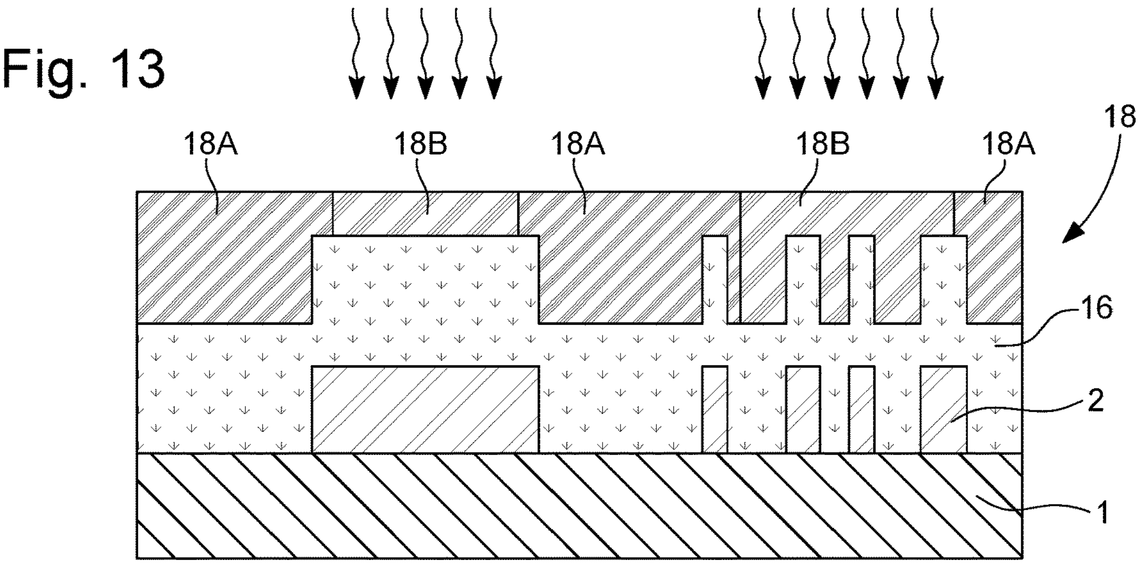
FIG. 13 is a view similar to that of FIG. 12 which illustrates the deposition, over the additional finishing layer, of a second photosensitive resin layer wherein one could distinguish first areas which have not been exposed and second areas which have been directly insolated by means of a laser beam or through a mask and which correspond to the pattern that should be formed in the sacrificial material layer.

After that, as schematically illustrated in FIG. 12, the substrate 1 is covered by at least one additional finishing layer 16, itself covered by a second photosensitive resin layer 18 as shown in FIG. 13. Afterwards, this second photosensitive resin layer 18 is selectively insolated for example by means of a laser beam or through a mask whose openings correspond to the areas of the sacrificial material layer 2 that should be preserved to create the decorative or technical pattern 20 that should appear at the surface of the substrate 1.

Figure 14:
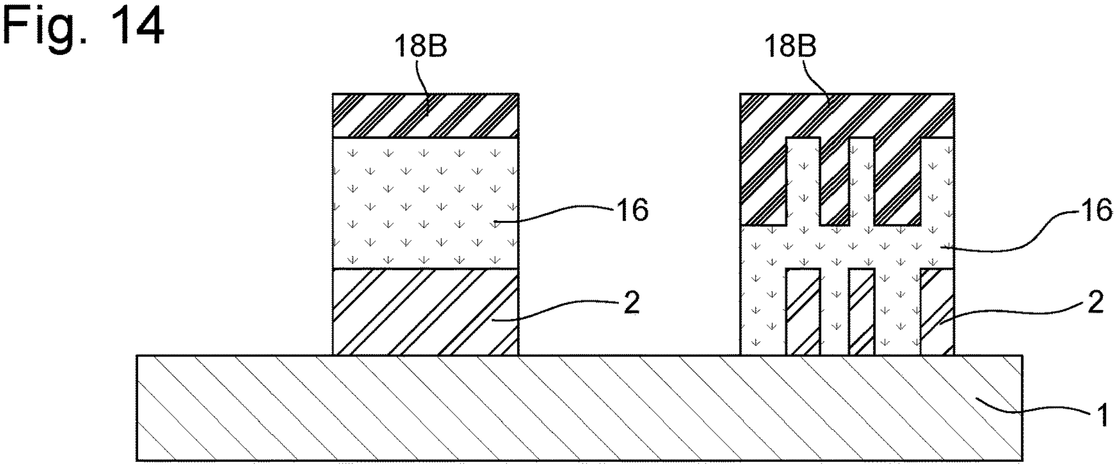
FIG. 14 is a view similar to that of FIG. 13 which illustrates the development of the photosensitive resin layer after insolation of the latter directly by means of a laser beam or through a mask, the first areas that are not exposed being eliminated and only the second areas that have been exposed to light and which correspond to the desired pattern subsist.

After insolation, one could distinguish in the photosensitive resin layer 18 first areas 18A which have not been exposed to selective lighting, and second areas 18B which have been selectively lit up and which correspond to the portions of the sacrificial material layer 2 and of the additional finishing layer 8 that should be preserved. Afterwards, the photosensitive resin layer 18 is developed so that the first areas 18A are eliminated and that only the second areas 18B that have been exposed to light subsist as shown in FIG. 14.

Figure 15:
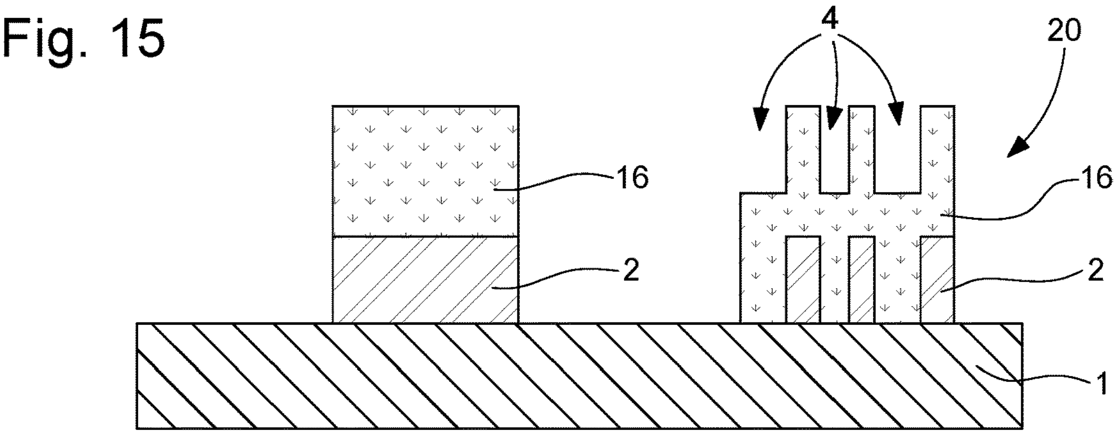
FIG. 15 is a view similar to that of FIG. 14 which illustrates the elimination of the portions of the photosensitive resin layer that have been exposed to light.

Afterwards, the substrate 1 is subjected to a chemical etching so as to eliminate the portions of the additional finishing layer 16 and of the sacrificial material layer 2 that are not covered by the photosensitive resin. Finally, as shown in FIG. 15, a substrate 1 is obtained some areas of which are exposed and have a polished aspect, whereas other areas of the substrate 1 are covered by the sacrificial material layer 2 coated with the additional finishing layer 16 and in which the cavities 4 are structured so as to form the decorative or technical pattern 20 with a satin or matt aspect.

It goes without saying that the present invention is not limited to the embodiment that has just been described and that various simple modifications and variants could be considered by a person skilled in the art without departing from the scope of the invention as defined by the appended claims. In particular, it should be understood that the first layer deposited over the substrate 1 is called sacrificial material layer 2 because it is intended to be completely eliminated except for the location where the decorative or technical pattern 20 is structured. This is why this sacrificial material layer 2 is preferably made of a resistant and inexpensive material. Moreover, it should be noted that the thicker the sacrificial material layer 2, the easier it will be to structure the cavities 4. However, it should be ensured that this sacrificial material layer 2 is not too thick, at the risk that internal mechanical stresses appear in this layer which could cause delamination problems. It should also be noted that the substrate 1 is preferably polished and/or opaque.

Nomenclature

1. Substrate
2. Sacrificial material layer
4. Cavities
6. Bath
8. Additional finishing layer
10. Photosensitive resin layer
10A. First areas
10B. Second areas
12. Pattern
14. First photosensitive resin layer
14A. First areas
14B. Second areas
16. Additional finishing layer
18. Second photosensitive resin layer
18A. First areas
18B. Second areas
20. Pattern

The invention claimed is:

1. A method for decorating a substrate which comprises the succession of the following steps:
- depositing a layer of a sacrificial material over a surface of a substrate;
- structuring the sacrificial material layer so as to create in said sacrificial material layer a plurality of cavities in a depth direction of the sacrificial material layer having different depths to form a decorative or technical pattern; and
- eliminating the sacrificial material layer except at the location where the pattern is provided.

2. The decoration method according to claim 1, wherein after structuring of the sacrificial material layer to create the cavities therein, and before elimination of the sacrificial material layer over the entire surface of the substrate except at the location where the pattern is provided, at least one additional finishing layer is deposited over the sacrificial material layer.

3. The decoration method according to claim 2, wherein the additional finishing layer is made with one or more metallic material(s) or else of oxides, nitrides, carbides or carboxinitrides of these metallic materials.

4. The decoration method according to claim 3, wherein the metallic material(s) of which the additional finishing layer is made are selected from the group consisting of: chromium, zirconium, gold, titanium and aluminium.

5. The decoration method according to claim 2, wherein after structuring of the sacrificial material layer and deposition of the additional finishing layer, the following steps are performed:
- deposit a layer of a photosensitive resin over the sacrificial material layer possibly coated with the additional finishing layer;
- expose the photosensitive resin layer directly to the action of a laser beam or else to a light radiation selectively at the locations corresponding to the decorative or technical pattern that should appear in the sacrificial material layer;
- eliminate the photosensitive resin layer and the underlying sacrificial material layer possibly covered by the additional finishing layer at the locations where the photosensitive resin layer has not been exposed;

eliminate the photosensitive resin layer that subsists at the locations where the sacrificial material layer should be preserved.

6. The decoration method according to claim 1, wherein at least some of the cavities created in the sacrificial material layer cross said sacrificial material layer up to the substrate.

7. The decoration method according to claim 1, wherein the sacrificial material layer is deposited at the surface of the substrate by physical vapour deposition, by chemical vapour deposition or else by electroplating when the substrate is electrically-conductive.

8. The decoration method according to claim 1, wherein the sacrificial material layer is made with one or more metallic material(s) or else of oxides, nitrides, carbides or carboxinitrides of this or these metallic material(s).

9. The decoration method according to claim 8, wherein the metallic material is selected from the group consisting of: chromium, zirconium, titanium and aluminium.

10. The decoration method according to claim 9, wherein the sacrificial material layer has a thickness between 100 nm and 10 μm.

11. The decoration method according to claim 10, wherein the sacrificial material layer has a thickness between 500 nm and 2 μm.

12. The decoration method according to claim 10, wherein the sacrificial material layer has a thickness between 500 nm and 2 μm.

13. The decoration method according to claim 1, wherein the cavities in the sacrificial material layer are created by wet or dry chemical etching, by laser ablation or else by photolithography.

14. The decoration method according to claim 13, wherein the wet or dry chemical etching affects the entire surface of the sacrificial material layer or else is done through the openings of a mask set over the sacrificial material layer and whose outlines correspond to the decorative or technical pattern that should appear in the sacrificial material layer.

15. The decoration method according to claim 13, wherein the photolithography creates the cavities in the sacrificial material layer directly by ablation with a laser beam or with a light radiation through the openings of a mask set over said sacrificial material layer and whose outlines correspond to the decorative or technical pattern that should appear in the sacrificial material layer.

16. The decoration method according to claim 1, wherein the substrate is an external part element for a watch case or for a jewellery item.

17. The decoration method according to claim 16, wherein the substrate is a bridge, a plate, a bezel, a middle, a crystal, a dial, a back or a bracelet link.

18. The decoration method according to claim 17, wherein the substrate has a polished and/or opaque aspect.

19. The decoration method according to claim 16, wherein the substrate has a polished and/or opaque aspect.

* * * * *